United States Patent [19]
Yamaguchi et al.

[11] Patent Number: 5,188,572
[45] Date of Patent: Feb. 23, 1993

[54] INTERNALLY MESHING PLANETARY GEAR STRUCTURE

[75] Inventors: Katsuyoshi Yamaguchi, Nagoya; Masatoshi Kondoh, Ohbu; Shigeo Hayashi, Ohbu; Masayoshi Sonokawa, Ohbu; Shoichi Matsuzawa, Ohbu; Atsushi Takahashi, Ohbu, all of Japan

[73] Assignee: Sumitomo Heavy Industries, Ltd., Tokyo, Japan

[21] Appl. No.: 797,748

[22] Filed: Nov. 25, 1991

[30] Foreign Application Priority Data

| Nov. 27, 1990 | [JP] | Japan | 2-123616[U] |
| Nov. 27, 1990 | [JP] | Japan | 2-123617[U] |
| Nov. 27, 1990 | [JP] | Japan | 2-123618[U] |
| Nov. 27, 1990 | [JP] | Japan | 2-123619[U] |
| Nov. 27, 1990 | [JP] | Japan | 2-123620[U] |
| Dec. 26, 1990 | [JP] | Japan | 2-402047[U] |

[51] Int. Cl.$^5$ .............................................. F16H 1/32
[52] U.S. Cl. ........................................ 475/168; 475/176
[58] Field of Search ................ 475/168, 176, 177, 178

[56] References Cited

U.S. PATENT DOCUMENTS

| 1,421,375 | 7/1922 | Baines | 475/168 |
| 4,297,920 | 11/1981 | Richter | 475/168 |
| 4,594,915 | 6/1986 | Braren | 74/805 |

FOREIGN PATENT DOCUMENTS

| 153604 | 9/1985 | European Pat. Off. | 475/168 |
| 895609 | 1/1945 | France. | |
| 61-266849 | 11/1986 | Japan | 475/168 |
| 63-243549 | 10/1988 | Japan | 475/168 |
| 955097 | 4/1964 | United Kingdom | 475/178 |
| 2117081 | 10/1983 | United Kingdom. | |
| WO88/08349 | 11/1988 | World Int. Prop. O. . | |

Primary Examiner—Leslie A. Braun
Assistant Examiner—William O. Trousdell
Attorney, Agent, or Firm—Nikaido, Marmelstein, Murray & Oram

[57] ABSTRACT

In an internally meshing planetary gear structure with trochoidal tooth profile, the input shaft and the eccentric body are coupled so that radial displacement is possible and that the displacement between the eccentric body shaft and the input shaft is absorbed. In addition to this, positioning members or thrust bearings are used to suppress the axial movement or the inclination of the eccentric body or the external-toothed gears.

14 Claims, 16 Drawing Sheets

F I G. 9A
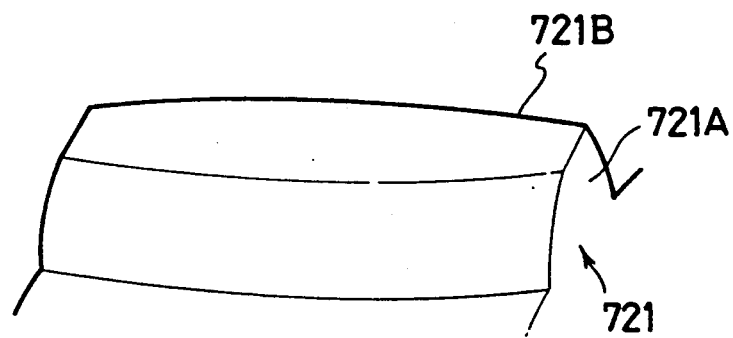
F I G. 9B
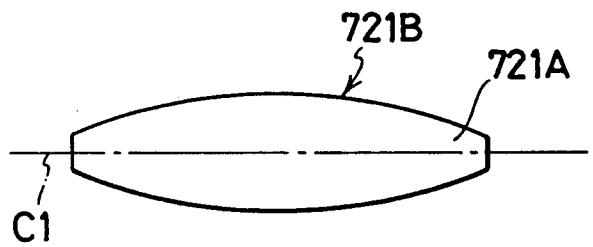
F I G. 9C
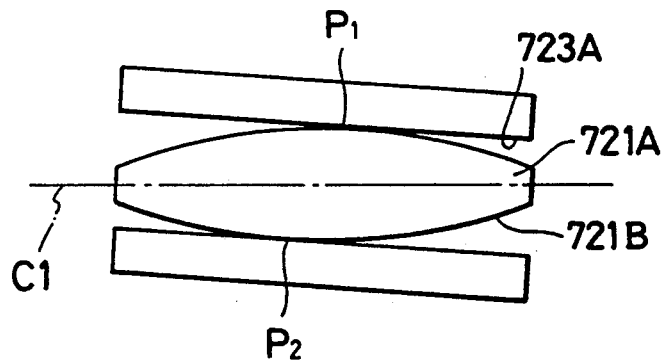

INTERNALLY MESHING PLANETARY GEAR STRUCTURE

BACKGROUND OF THE INVENTION

1. Field of the Invention

The present invention relates to an internally meshing planetary gear structure which is ideal for application in reduction gears or speed-up gears, more particularly, which is ideal for application in reduction gears or speed-up gears which have to meet the requirements of being of small size and providing high output.

2. Description of the Prior Art

Conventional internally meshing planetary gear structures comprising a first shaft, an eccentric body mounted on the circumference of the first shaft, a plurality of external-toothed gears which are mounted eccentrically on the first shaft by means of the eccentric body, an internal-toothed gear which meshes internally with the external-toothed gears, and a second shaft coupled to the external-toothed gears through a means which transmits only the rotational component of the external-toothed gears are widely known.

A prior art example of the structure is shown in FIG. 13 and FIG. 14. In the prior art example, by making the first shaft the input shaft, the second shaft the output shaft, and by fixing the internal-toothed gear, the above-described structure is applied to a reduction gear.

Eccentric bodies 3a, 3b are mounted on an input shaft 1 with a fixed phase difference (in this example 180°). Incidentally, the eccentric bodies 3a, 3b are integrated into one body. Two external-toothed gears 5a, 5b are mounted on the eccentric bodies 3a, 3b, respectively, by means of rollers 4. The external-toothed gears 5a, 5b have a plurality of inner roller holes 6, into which inner pins 7 and inner rollers 8 are inserted.

The circumference of the external-toothed gears 5a, 5b is equipped with external teeth 9, which have trochoidal, circular, or the like tooth profiles. The external teeth 9 and an internal-toothed gear 10 mesh internally. The internal-toothed gear 10 is fixed to a casing 12. To be concrete, the structure of the internal teeth of the internal-toothed gear 10 is such that outer pins 11 are loosely fitted into outer pin holes 13 to allow easy rotation.

The inner pins 7, which pass through the external-toothed gears 5a, 5b, are tightly fixed to a flange 14 of an output shaft 2.

When the input shaft 1 makes one revolution, the eccentric bodies 3a, 3b also make one revolution. One revolution of the eccentric bodies 3a, 3b causes the external-toothed gears 5a, 5b to tend to perform swinging and rotating movements around the input shaft 1. However, as the internal-toothed gear 10 restricts the rotation of the external-toothed gears 5a, 5b, the external-toothed gears 5a, 5b perform almost only swinging movements while internally contacting the internal-toothed gear 10.

If it is assumed that, for instance, the number of teeth of the external-toothed gears 5a, 5b is N and the number of teeth of the internal-toothed gear 10 is N+1, then the difference between the numbers of teeth is 1. Consequently, every revolution of the input shaft 1 causes the external-toothed gears 5a, 5b to undergo a shifting (to make a rotation) of one tooth relative to the internal-toothed gear 10 which is fixed to the casing 12. This means that one revolution of input shaft 1 has been decelerated by $-1/N$ revolutions of the external-toothed gear.

The swinging component of the external-toothed gears 5a, 5b is absorbed by gaps between the inner roller holes 6 and the inner pins 7, and only the rotational component of that is transmitted to the output shaft 2 through the inner pins 7.

Therefore, a reduction of reduction ratio $-1/N$ is achieved.

In the prior art example, the internal-toothed gear of the internally meshing planetary gear structure is fixed, the first shaft is the input shaft and the second shaft is the output shaft. However, a reduction gear can also be designed with the second shaft being fixed, the first shaft being the input shaft and the internal-toothed gear being the (big) output shaft. Further, reversing the inputs and outputs also allows to design a step-up gear.

However, the following problems have been associated with the above-described internally meshing planetary gear structure.

As shown in FIG. 15, when considering loads acting on the input shaft 1 and the output shaft 2, it is apparent from the figure that a rotational load W1 from the input shaft 1 to the output shaft 2 acts at the edge position of a bearing 15b. Furthermore, a load W2 from the external-toothed gears (not shown in FIG. 15) to the output shaft 2 acts on the inner pin 7 as illustrated. In addition, a load W3 from the external-toothed gears 5a, 5b to the input shaft 1 acts on the input shaft 1 as shown.

Therefore, the output shaft 2 is subjected to the loads W1, W2 while being in a cantilever state, because the loads W1, W2, which act on the output shaft 2, are located closer to the input shaft 1 than bearings 16a, 16b. Consequently, the resultant moment causes the output shaft 2 to be inclined at an angle $\alpha$ to its normal axis center 01.

Also, the moment of the load W3, with the load W3 acting on the input shaft 1, causes the input shaft 1 to be inclined by an angle $\beta$ from its normal axis center 01, in conjunction with the inclination of the output shaft 2.

Consequently, the input shaft 1 and the output shaft 2 rotate with their axis centers being displaced, which causes abnormal wear, noise and vibration of the reduction gear.

Also, as illustrated in FIG. 16, when an external radial load F acts on the input shaft 1, then, in the same manner as described above, the input shaft 1 inclines by an angle $\beta'$ from its normal axis center 01, and the output shaft 2 inclines by an angle $\alpha'$ from its normal axis center 01. This inclination also causes abnormal wear, noise and vibration of the reduction gear.

The above-described inclination of the output shaft 2 or the input shaft 1 results from that the input shaft 1 is supported by bearings 15a, 15b on the input shaft 1, with said input shaft 1 receiving the load W3 from the external-toothed gears 5a, 5b through the eccentric bodies 3a, 3b.

On the other hand, in above-described conventional internally meshing planetary gear structures, the radial load is balanced because the transmission torque is equally distributed on the external-toothed gears 5a, 5b. However, since the two external-toothed gears 5a, 5b do not lie in the same plane, a load acting on each external-toothed gear 5a, 5b causes a moment (a couple of forces) to act on the eccentric bodies 3a, 3b (refer to FIG. 13).

Since the moment acting on the eccentric bodies 3a, 3b, corresponds to the product of the load acting on the external-toothed gears 5a, 5b and the distance between the two external-toothed gears 5a, 5b, reducing the distance between the two external-toothed gears 5a, 5b will reduce the moment acting on the eccentric bodies 3a, 3b. However, the external-toothed gears 5a, 5b are supported by the eccentric bodies 3a, 3b and the rollers 4, and the eccentric bodies 3a, 3b and the rollers 4 are required to have an adequate length. Because their load capacity depends upon their length. Therefore, reducing the distance between the external-toothed gears 5a, 5b has its limitations.

SUMMARY OF THE INVENTION

The present invention was carried out in view of the above-described existing problems. More specifically, it is an object of the present invention to provide an internally meshing planetary gear structure which reduces abnormal wear, noise and vibrations to the utmost by satisfactorily accommodating the radial load from the external-toothed gears which acts through the eccentric body on the first shaft.

To achieve this aim, the present invention (first to third invention) provides an internally meshing planetary gear structure comprising a first shaft, an eccentric body mounted on the circumference of the first shaft, a plurality of external-toothed gears which are mounted eccentrically on the first shaft by means of the eccentric body, an internal-toothed gear which meshes internally with the external-toothed gears, and a second shaft coupled to the external-toothed gears through a means which transmits only the rotational component of the external-toothed gears, in which the eccentric body is coupled to the first shaft so that the eccentric body can be radially displaced to the extent of not impairing the function of the internally meshing rotation of the external-toothed gears. The flexible coupling between the eccentric body and the first shaft provides the possibility of eliminating the disadvantageous condition of the shaft center of being displaced due to the load from the external-toothed gears.

However, a mere flexible coupling between the eccentric body and the first shaft does not allow for a satisfactory positioning of the eccentric body on the first shaft, because a thrust force caused by a moment arises at the eccentric body. Also, depending upon the arising moment, the eccentric body and the first shaft may come into violent contact or whirling may occur, which, on the contrary, give rise to abnormal wear, noise and vibration.

Accordingly, in the first invention (claim 1), a positioning member for the eccentric body is mounted. The positioning member restricts the axial movement of the eccentric body relative to the first shaft and receives the moment which tends to incline the eccentric body relative to the axis line of the first shaft. Therefore, the eccentric body can be satisfactorily positioned on the first shaft, the radial load arising from the eccentric body toward the first shaft can be effectively suppressed, and newly arising abnormal wear, and the like caused by the flexible coupling between the first shaft and the eccentric body can be prevented.

If the positioning member is directly mounted on the first shaft, the positioning member rotates synchronously with the eccentric body, thereby eliminating any risk of abnormal wear, and the like due to sliding between the positioning member and the eccentric body.

Further, the following composition can be designed. Namely, a means which transmits only the rotational component of the external-toothed gears is comprised of inner pin holes formed by passages in the external-toothed gear and inner pins having a diameter smaller than the diameter of the inner pin holes, passing through the inner pin holes and being fixed to the second shaft. And inner pin retaining rings which retain the inner pins are mounted on both sides of the external-toothed gears with the external-toothed gears in between. Further the positioning member is mounted on the inner pin retaining rings.

Also, if two of the external-toothed gears are provided, with each external-toothed gear being fitted to the eccentric body by means of two angular bearings which are positioned so that the directions of the bearing action lines face each other, then the distance between the two external-toothed gears can be substantially reduced, which allows to decrease the arising moment (claims 2, 9, 13).

Also, if angular bearings with the directions of the bearing-action-line facing each other are used, then an increase in the load of one external-toothed gear will cause an increase in the load of the other external-toothed gear, thus providing the external-toothed gears with a mutual self-aligning function. Consequently, the load acting on the external-toothed gears is equally distributed, which eliminates the edge load and reduces the occurrence of abnormal wear, noise and vibration in conjunction with the presence of the thrust bearings.

Also, if the first shaft and the eccentric body are coupled by means of a spline tooth and spline groove engagement such that radial displacement is possible, it is recommended to form a crowning at the spline teeth along the tooth trace of the spline teeth (claims 3, 10).

Also, if the external-toothed gears are fitted to the eccentric body by means of roller bearings, it is recommended to form an axial crowning at the rollers of the roller bearings (claims 4, 11, 14).

If, in this manner, crowning is formed at the spline teeth or the rollers of the roller bearings, end face contact between the spline teeth and spline grooves or end face contact between the rollers of the roller bearings and their internal and external rings can be prevented, even if the eccentric body is inclined.

Also, it is recommended to control the gap between the positioning member and the eccentric body so that it becomes a predetermined specific gap (claim 7). Namely, due to variations resulting from machining and assembly tolerance and due to changes in the gap resulting from sliding wear, it is in general difficult to keep the gap between the positioning member and the eccentric body constant. However, if the gap is too large, then, owing to the constitution in which the eccentric body is arranged so that it floats at some distance from the first shaft, depending upon the arising moment, the eccentric body and the first shaft or the eccentric body and the positioning member tend to come into violent contact, or extensive whirling may rise to increased noise and vibration. On the other hand, if the gap is too small, sliding resistance and sliding friction will increase, thereby increasing the risk of transmission loss of motive force, seizure, and the like.

It is therefore recommended to actively control the gap between the eccentric body and the positioning member to make sure that the gap is without fail within preset fixed values. As a result, this will provide the possibility of satisfactorily positioning the eccentric body on the first shaft as well as the possibility of effectively suppressing the radial (offset) load arising from the eccentric body toward the first shaft and of preventing almost completely newly arising abnormal wear, and the like which might be caused by the flexible coupling between the eccentric body and the first shaft.

Also, from this point of view, it is recommended to apply surface treatment to at least one of the sliding surfaces between the positioning member and the eccentric body to prevent wear and seizure of the sliding surfaces (claim 5).

Or, it is recommended to place a thrust washer, to which surface treatment has been applied to prevent wear and seizure, between the sliding surfaces of the positioning member and the eccentric body (claim 6). This will also allow an easy control of the gap.

On the other hand, the second invention (claim 7) intends to remedy new drawbacks resulting from the flexibility and therefore has the following constitution.

Namely in the second invention, means which transmits only the rotational component of the external-toothed gear is composed of inner pin holes formed by passages in the external-toothed gear, and inner pins having a diameter smaller than the diameter of the inner pin holes, passing through the inner pin holes and being fixed and linked to the second shaft. And inner pin retaining rings which retain the inner pins and are mounted on both sides of the external-toothed gear with the external-toothed gear in between are provided, further, thrust bearings are positioned between the inner pin retaining rings and the external-toothed gear.

Therefore, the thrust reactive force which acts on the external-toothed gear can be supported by the thrust bearings, the radial (offset) load arising from the eccentric body toward the first shaft can be effectively suppressed, and, combined with the flexible coupling between the eccentric body and the first shaft, the transmission of the radial load from the eccentric body to the first shaft can be eliminated. Consequently, no radial load except the torsional load resulting from the rotating torque will act on the first shaft, which eliminates vibration and noise resulting from the whirling phenomenon of the first shaft and provides the possibility of miniaturizing or omitting bearings used for supporting the first shaft.

Claims 9, 10 and 11 are intended to be of the same spirit as claims 2, 3 and 4.

The third invention (claim 12) also intends to remedy new drawbacks resulting from the flexibility, and therefore has the following constitution.

Namely in the third invention, means which transmits only the rotational component of the external-toothed gear is composed of inner pin holes formed by passages in the external-toothed gear, and inner pins which have a diameter smaller than the diameter of the inner pin holes, pass through the inner pin holes and are fixed and linked to the second shaft. And inner pin retaining rings which retain the inner pins and are mounted on both sides of the external-toothed gear with the external-toothed gear in between are provided, further, thrust bearings are positioned between the eccentric body and one of the two inner pin retaining rings to restrict the eccentric bodys axial movement toward the side of the inner pin retaining ring. In addition to this, the eccentric body is coupled to the first shaft by a shaft coupling which can be radially displaced to the extent of not impairing the function of the internally meshing rotation of the external-toothed gear. This shaft coupling also has the thrust bearings function of preventing the eccentric body from moving toward the side of the other inner pin retaining ring.

That is, the constitution of the third invention comprises inner pin retaining rings, which retain the inner pins and are mounted on both sides of the external-toothed gear with the external-toothed gear in between, thrust bearings which are mounted between one of the inner pin retaining rings and the eccentric body to restrict the eccentric bodys axial movement in one direction, and the shaft coupling, which can move radially, and have the function of restricting the axial movement in the other direction.

For example, Oldham ball type shaft couplings are shaft couplings with such a function.

Therefore, it is possible to support the thrust reactive force acting on the eccentric body by both thrust bearings and to effectively suppress the radial (offset) load arising from the eccentric body toward the first shaft, and, combined with the flexible coupling between the eccentric body and the first shaft, the transmission of the radial load from the eccentric body to the first shaft is eliminated. Consequently, no radial load except the torsional load resulting from the rotating torque acts on the first shaft, which eliminates vibration and noise resulting from the whirling phenomenon of the first shaft and provides the possibility of miniaturizing or omitting bearings used for supporting the first shaft.

Claims 13 and 14 are intended to be of the same spirit as claims 2 and 4.

BRIEF DESCRIPTION OF THE DRAWINGS

The above and other objects, features and advantages of the present invention will become more apparent from the following description of the invention taken in conjunction with the accompanying drawings, wherein like reference characters designate the same or similar parts, and wherein:

FIG. 9 is an oblique drawing showing a spline tooth of the input shaft of the seventh embodiment.

DESCRIPTION OF THE PREFERRED EMBODIMENTS

Figure 1:
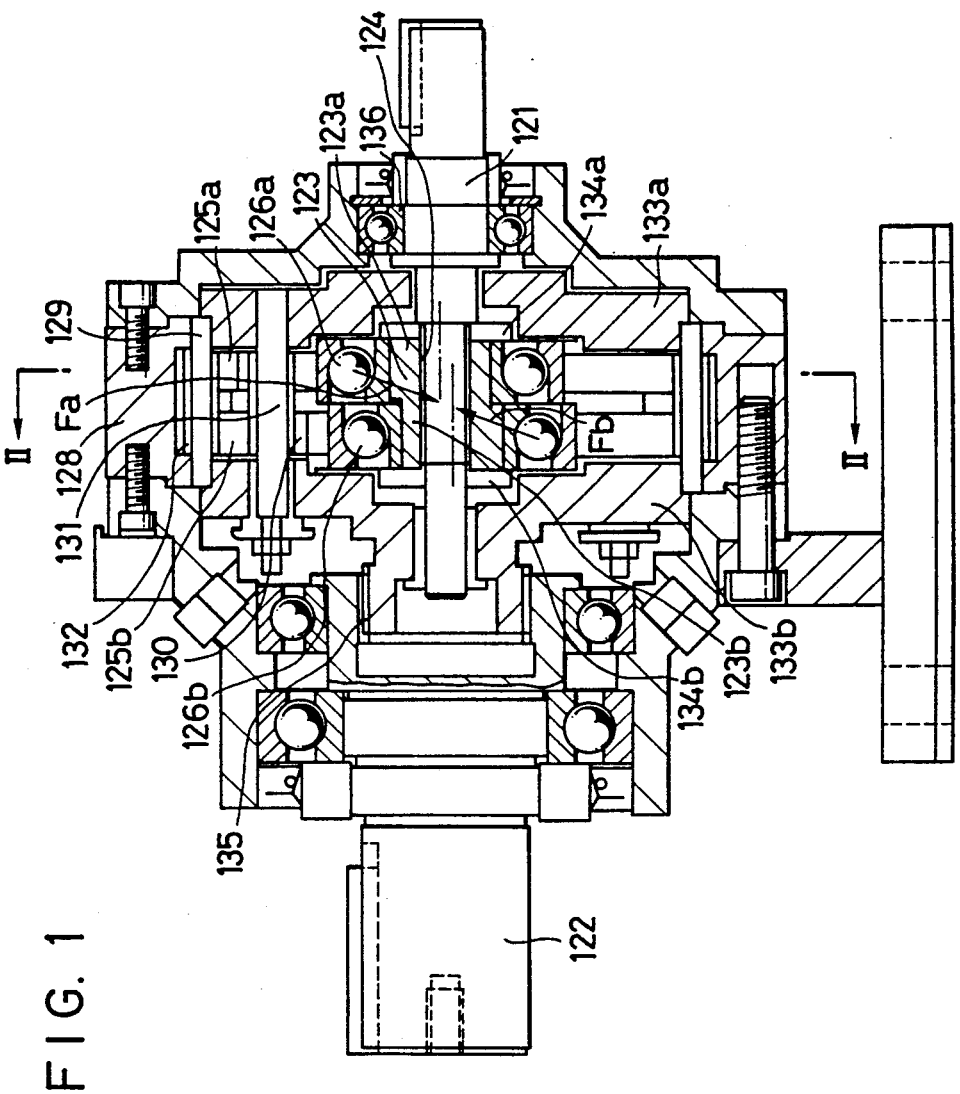
FIG. 1 is a schematic drawing of a longitudinal cross section showing a reduction gear to which the first embodiment of the internally meshing planetary gear structure of the present invention is applied.

Embodiments of the present invention will be described in detail hereinunder with reference to the accompanying drawings.

By making the "first shaft" the input shaft, the "second shaft" the output shaft and by fixing the "internal-toothed gear" in all embodiments described hereinunder, the internally meshing planetary gear structure is applied to a "reduction gear".

Incidentally, by making the "first shaft" the input shaft, the "internal-toothed gear" the (big) output shaft and by fixing the "second shaft", it is also possible to apply the internally meshing planetary gear structure in the same manner to a reduction gear. In addition, reversing the inputs and outputs allows said applications to speed-up gears.

In each embodiment, identical last two digits of the reference characters designate the same or similar parts.

Figure 2:
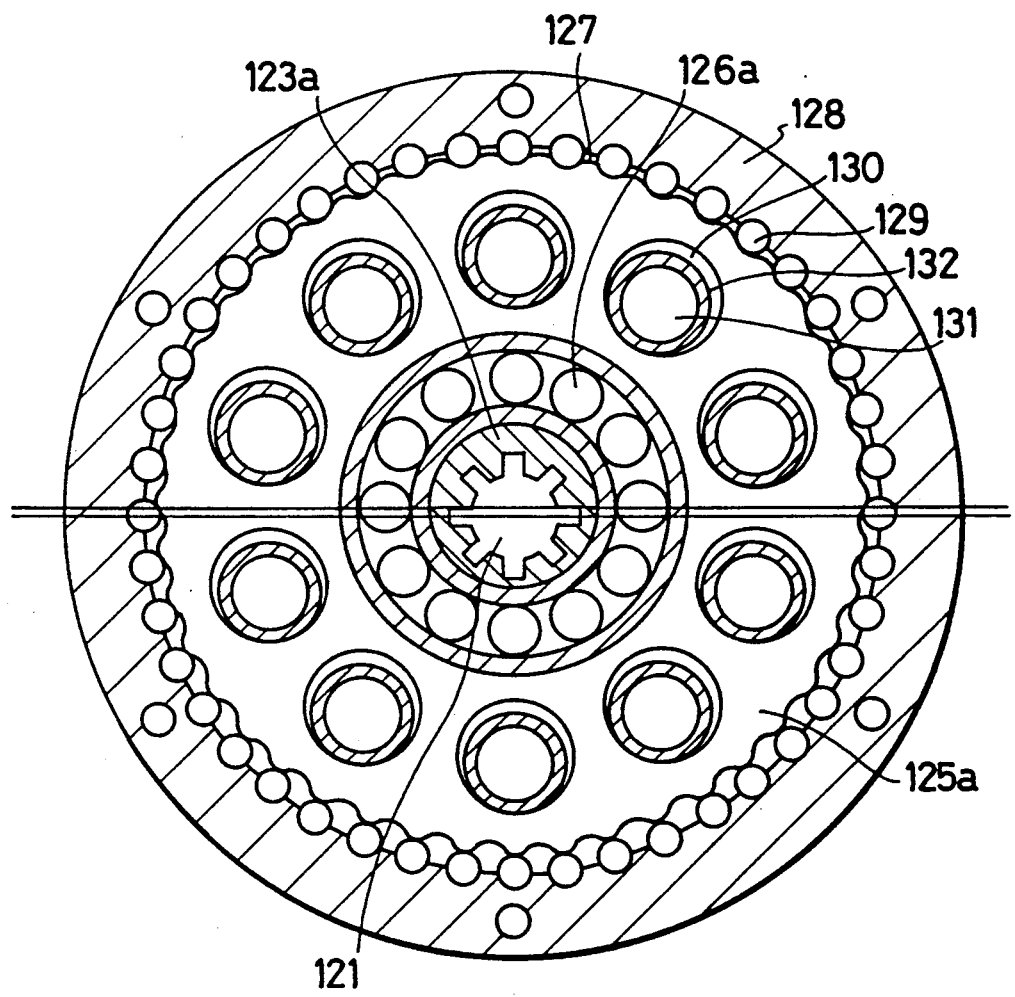
FIG. 2 is a drawing showing a cross sectional view taken along arrows II—II of FIG. 1.

In FIG. 1 and FIG. 2, a hollow eccentric body shaft 123 is mounted on an input shaft 121. The eccentric body shaft 123 is coupled to the input shaft 121 by means of a flexible coupling means 124, such as a spline coupling or Oldham coupling, which absorbs the radial displacement. The eccentric body shaft 123 consists of two eccentric bodies 123a, 123b. Two external-toothed gears 125a, 125b are fitted to the eccentric bodies 123a, 123b by means of angular bearings 126a, 126b so that the two external-toothed gears 125a, 125b can rotate while swinging as much as the eccentricity of the eccentric bodies 123a, 123b.

The angular bearings 126a, 126b are ball bearings or roller bearings. These angular bearings 126a, 126b support both axial and radial loads and are arranged in this embodiment so that the directions of the bearing-action-line Fa, Fb face each other.

The amount of radial displacement due to the flexible coupling between the eccentric body shaft 123 and the input shaft 121 is smaller than the eccentricity of the eccentric bodies 123a, 123b and ranges within limits which do not impair the function of the internally meshing rotation of the external-toothed gears 125a, 125b.

Distance pieces (positioning members) 134a, 134b, which are integrated into the input shaft 121, are mounted on both sides of the eccentric bodies 123a, 123b or the angular bearings 126a, 126b with the eccentric bodies 123a, 123b or the angular bearings 126a, 126b in between.

The circumferences of the external-toothed gears 125a, 125b are equipped with external teeth having a trochoidal tooth profile, and the external-toothed gears 125a, 125b and an internal-toothed gear 128 mesh internally. The internal-toothed gear 128 and the casing are integrated into one body. Further, the internal-toothed gear 128 has a circular tooth profile formed by outer pins 129. The outer pins 129 mesh internally with the external-toothed gears 125a, 125b.

The external-toothed gears 125a, 125b have inner pin holes 130. In the inner pin holes 130, inner pins 131 are fitted with some clearance space in between. Inner rollers 132 are fitted to the circumference of the inner pins 131 with some clearance space in between. This kind of fitting providing some clearance space absorbs the swinging movement of the external-toothed gears 125a, 125b. However, it is also possible to omit the inner rollers 132.

Both ends of the inner pins 131 are tightly fitted into inner pin retaining rings 133a, 133b. The inner pin retaining rings 133a, 133b are mounted on both sides of the external-toothed gears 125a, 125b with the external-toothed gears 125a, 125b in between. The inner pin retaining ring 133b and the output shaft 122 are not directly coupled, but are coupled by means of a flexible coupling structure 135, as for example a spline coupling. The flexible coupling structure 135 is not intended to absorb the swinging movement of the external-toothed gears 125a, 125b (as described above, the swinging movement of the external-toothed gears 125a, 125b is absorbed by the gaps between the inner pins 131 and the inner pin holes 130), but is intended to absorbed slight swinging movements of the inner pin retaining ring 133b relative to the output shaft 122.

In the following the action of the embodiment will be described.

The load which acts on the two external-toothed gears 125a, 125b causes a moment to arise at the eccentric body shaft 123 (the eccentric bodies 123a, 123b). However, since the moment is supported at the distance pieces (positioning members) 134a, 134b located on the sides of the eccentric body and since the axial displacement of the eccentric body shaft 123 is restricted, the eccentric body shaft 123 does not require radial bearings to support the moment.

Since, according to the first embodiment, the distance pieces 134a, 134b are mounted on the input shaft 121, the distance pieces 134a, 134b rotate synchronously with the eccentric body shaft 123. Therefore, there is no risk of wear, seizure, and the like caused by rotational sliding.

Further, since the flexible coupling structure 124 (for example a spline coupling or Oldham coupling) between the eccentric body shaft 123 and the input shaft 121 which can be radially displaced, it is possible to nearly eliminate the transmission of the radial load from the eccentric body shaft 123 to the input shaft 121. Consequently, no radial load except the torsional load resulting from the rotating torque acts on the input shaft 121. Therefore, there is no vibration and noise caused by the whirling phenomenon of the input shaft 121, and it is possible to miniaturize or omit bearings used for supporting the input shaft 121.

Also, in this embodiment, since the external-toothed gears 125a, 125b are supported by the face-to-face duplex (the directions of the bearing-action-line face each other) angular bearings 126a, 126b, as illustrated by Fa, Fb, the bearing-action-line are inclined so that their directions face each other, and the distance between the two external-toothed gears 125a, 125b has been substantially decreased, which further reduces the moment itself.

In addition, when using the face-to-face duplex angular bearings 126a, 126b, the bearings lines of action Fa, Fb face each other. Thus, if, for example, the radial load of the external-toothed gear 125a increases, the angular bearing 126a pushes the angular bearing 126b outwards (toward the output shaft 122). This results in an increase in the load of the external-toothed gear 125b, because the angular bearing 126b has been pushed outwards. Thus, using the face-to-face duplex angular bearings 126a, 126b provides the external-toothed gears 125a, 125b with a mutual self-aligning function.

Therefore, the load acting on the external-toothed gears 125a, 125b is equally distributed, which, in conjunction with the presence of the distance pieces 134a, 134b, eliminates the one-side load and reduces the occurrence of abnormal wear, noise and vibration.

In addition, in the first embodiment since the coupling between the inner pin retaining ring 133b and the output shaft 122 is also a flexible coupling structure 135, it is possible to satisfactorily absorb the radial offset load which is applied to the output shaft 122.

Figure 3:
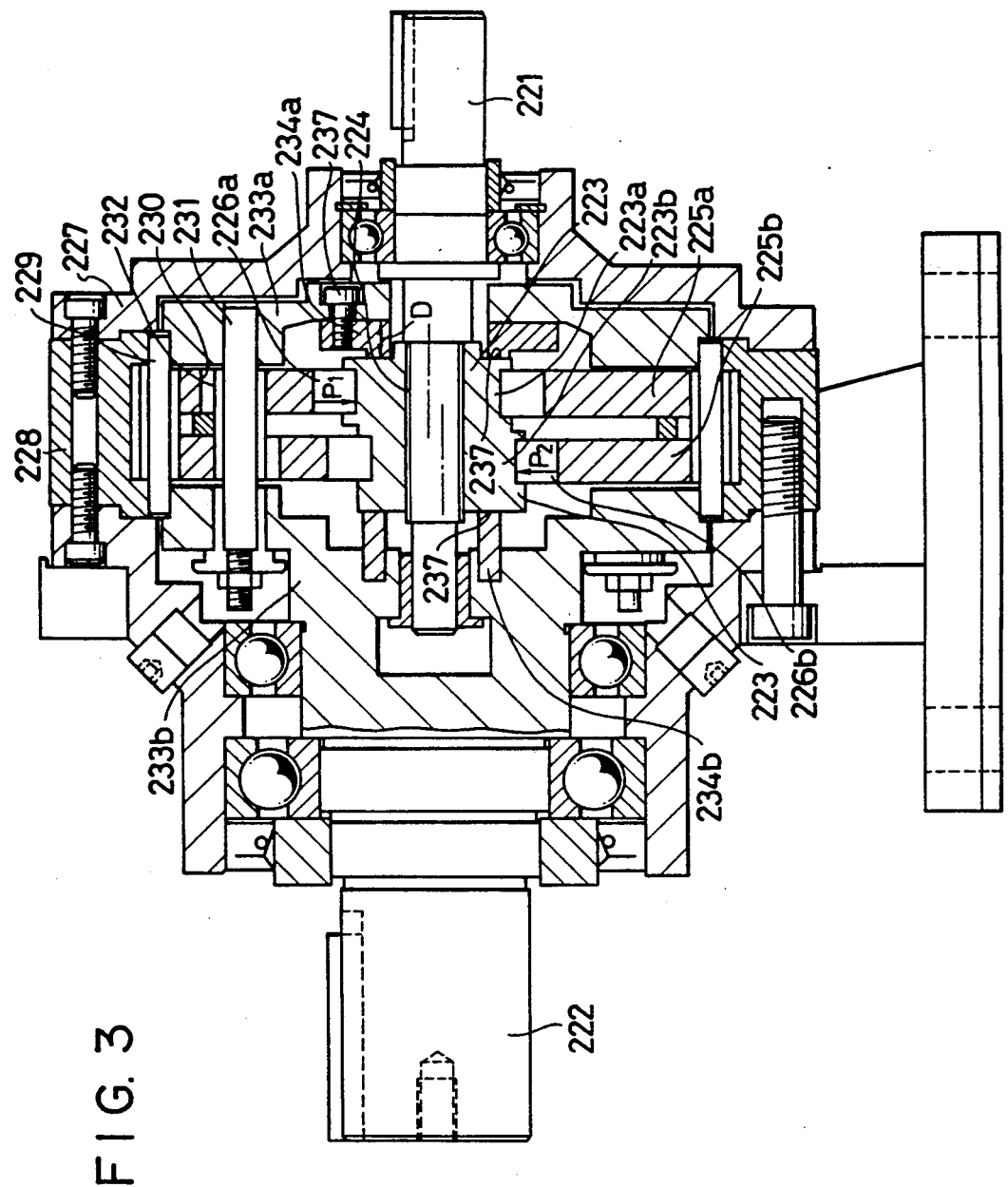
FIGS. 3 through 8 are schematic drawings of longitudinal cross sections showing the present inventions second through seventh embodiment.
Figure 4:
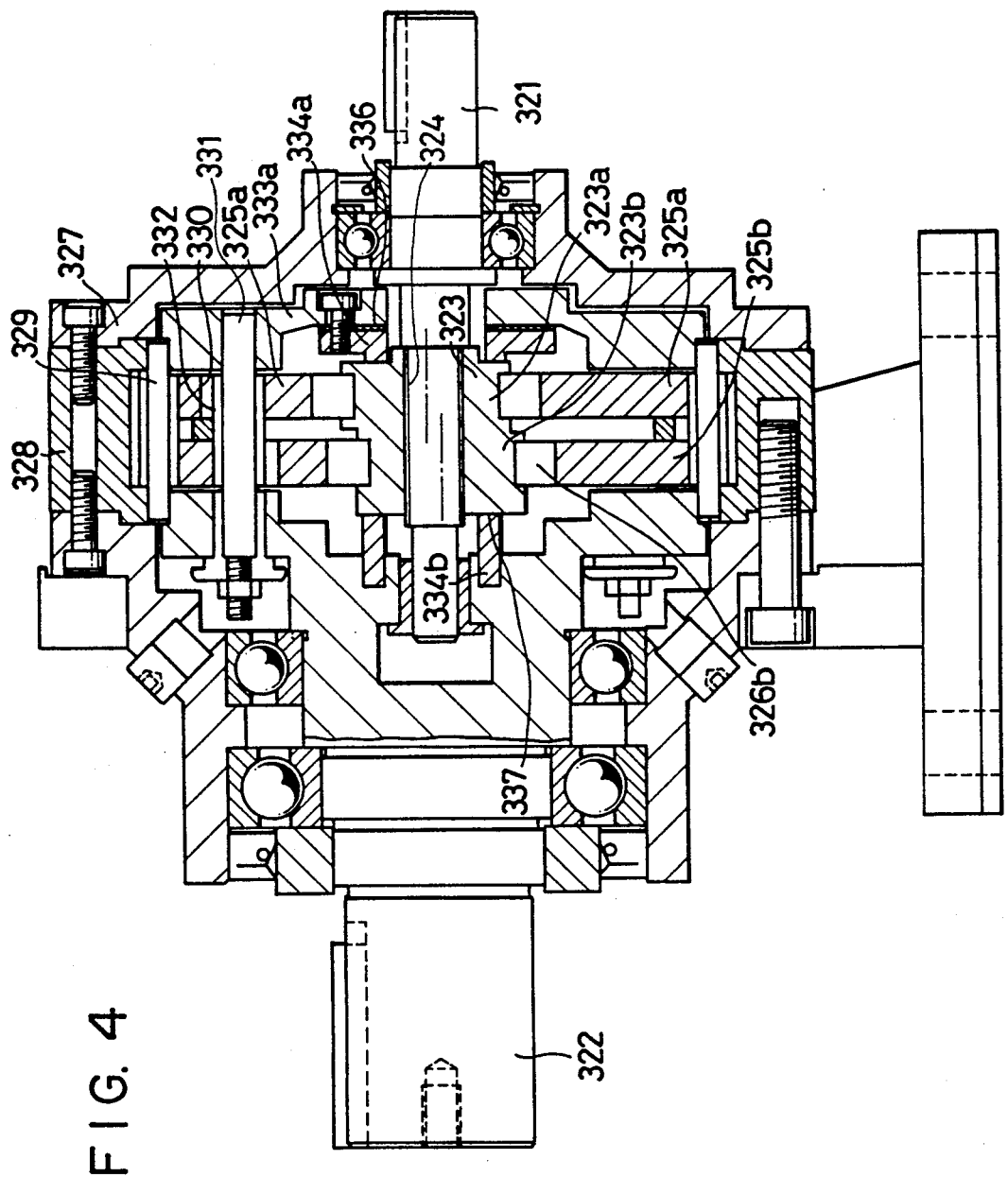
Figure 5:
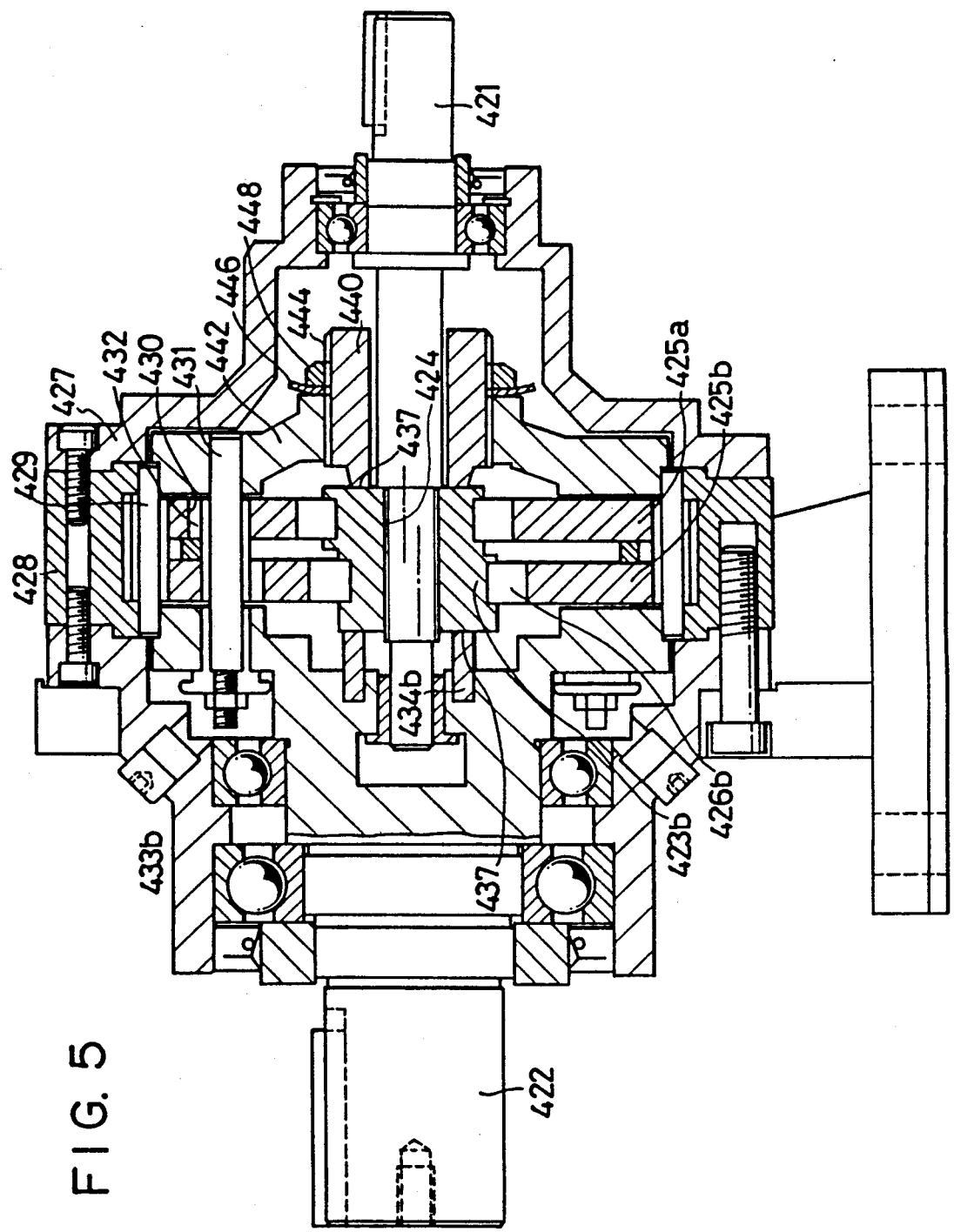

FIGS. 3 through 5 show embodiments in each of which the inner pin retaining rings are provided with positioning members and the gaps between the positioning members and the eccentric body are strictly controlled.

At first, the embodiment shown in FIG. 3 will be described.

In FIG. 3, a hollow eccentric body shaft 223 is mounted on an input shaft 221. The eccentric body shaft 223 is coupled to the input shaft 221 by means of a flexible coupling means 224, such as a spline coupling or Oldham coupling, which absorbs the radial displacement. The eccentric body shaft 223 consists of two eccentric bodies 223a, 223b. Two external-toothed gears 225a, 225b are fitted to the eccentric bodies 223a, 223b by means of bearings 226a, 226b so that the two external-toothed gears 225a, 225b can rotate while swinging as much as the eccentricity of the eccentric bodies 223a, 223b.

The amount of radial displacement due to the flexible coupling between the eccentric body shaft 223 and the input shaft 221 is smaller than the eccentricity of the eccentric bodies 223a, 223b and ranges within limits which do not impair the function of the internally meshing rotation of the external-toothed gears 225a, 225b.

The circumferences of the external-toothed gears 225a, 225b are equipped with external teeth having a trochoidal tooth profile, and the external-toothed gears 225a, 225b and an internal-toothed gear 228 mesh internally. The internal-toothed gear 228 and a casing 227 are integrated into one body. Further, the internal-toothed gear 228 has a circular tooth profile formed by outer pins 229. The outer pins 229 mesh internally with the external-toothed gears 225a, 225b.

The external-toothed gears 225a, 225b have inner pin holes 230. In the inner pin holes 230, the inner pins 231 are fitted with some clearance space in between. Inner rollers 232 are fitted to the circumference of the inner pins 231 with some clearance space in between. This kind of fitting providing some clearance space absorbs the swinging movement of the external-toothed gears 225a, 225b. However, it is also possible to omit the inner rollers 232.

Both ends of the inner pins 231 are tightly fitted into inner pin retaining rings 233a, 233b. The inner pin retaining rings 233a, 233b are mounted on both sides of the external-toothed gears 225a, 225b with the external-toothed gears 225a, 225b in between. The inner pin retaining ring 233b is integrated into the output shaft 222.

In this embodiment, a distance piece (positioning member) 234a is supported at the inner pin retaining ring 233a by means of a bolt 237. Further, a distance piece 234b is tightly fitted to the inner pin retaining ring 233b. The eccentric body shaft 223 (the eccentric bodies 223a, 223b) is held between the two distance pieces 234a, 234b. This structure restricts axial movement of the eccentric body shaft 223 on the input shaft 221, and the eccentric body shaft 223 can receive the reactive force contrary to the moment, which tends to incline eccentric body shaft 223 relative to the input shaft 221, from the distance pieces 234a, 234b. The bolt 237 is used to facilitate the removal and assembly of the distance piece 234a. Namely, the bolt 237 allows to remove the distance piece 234a in order to provide an adjustable gap D between the eccentric body shaft 223 and the two distance pieces 233a, 233b. To be concrete, 1) during assembly, the gap is adjusted by chipping to achieve the size of the set value, 2) a normal gap is ensured by providing several kinds of distance pieces 234b with slightly different thicknesses D from each other in advance, and by assembling (or replacing) one of them suitably according to changes in the size of the gap resulting from wear or variations due to manufacture.

In the following, the action of the embodiment of FIG. 3 will be described.

The load which acts on the two external-toothed gears 225a, 225b causes a moment to arise at the eccentric body shaft 223 (the eccentric bodies 223a, 223b). However, since the moment is supported at the distance pieces (positioning members) 234a, 234b located on the sides of the eccentric body and since the axial displacement of the eccentric body shaft 123 is restricted, the radial offset load from the eccentric body shaft 223 to the input shaft 221 is prevented.

Moreover, since the flexible coupling structure (such as a spline coupling or Oldham coupling) between the eccentric body shaft 223 and the input shaft 221 can be radially displaced, it is possible to eliminate "radial load itself" as well as "the radial offset load" from the eccentric body to the input shaft 221.

Consequently, no radial load except the torsional load resulting from rotating the torque acts on the input shaft 221. Therefore, there is no vibration and noise caused by the whirling phenomenon of the input shaft 221, and it is possible to miniaturize or omit bearings used for supporting the input shaft 221.

FIG. 4 shows another embodiment which is intended to be of the same spirit.

The embodiment uses a single distance piece 338a and the shim 336 which has an appropriate thickness. The shim 336 is inserted between the distance piece 338a and the inner pin retaining ring 334b. The remaining constitution is identical with that of the embodiment of FIG. 3 above.

FIG. 5 shows still another embodiment which is intended to be of the same spirit.

In this embodiment, the outer circumferential side of the distance piece 440 and the inner circumferential side of the inner pin retaining ring 442 are provided with screw threads 444 which have an identical pitch. The gap is adjusted by moving the distance piece 440 along the screw threads 444. When an appropriate gap 437 has been achieved, the position of the distance piece 440 is fixed using a washer 446 and a nut 448.

According to the embodiments of FIG. 3 through FIG. 5, the presence of the positioning member mounted on the inner pin retaining ring provides the possibility of satisfactorily receiving the moment arising at the eccentric body from the lateral direction and of preventing the eccentric body from inclining. Consequently, combined with the flexible coupling between the eccentric body and the first shaft, which allows radial displacement, the radial load acting on the input shaft can be almost eliminated. Therefore, the constitution prevents vibration and noise resulting from the whirling phenomenon of the input shaft and provides the possibility of miniaturizing or omitting bearings used for supporting the input shaft.

Further, in the embodiments, since the gap between the eccentric body and the positioning member is controlled so as to have a predetermined value, the above-described effects can be easily realized without giving rise to abnormal wear or loss of transmission.

Figure 6:
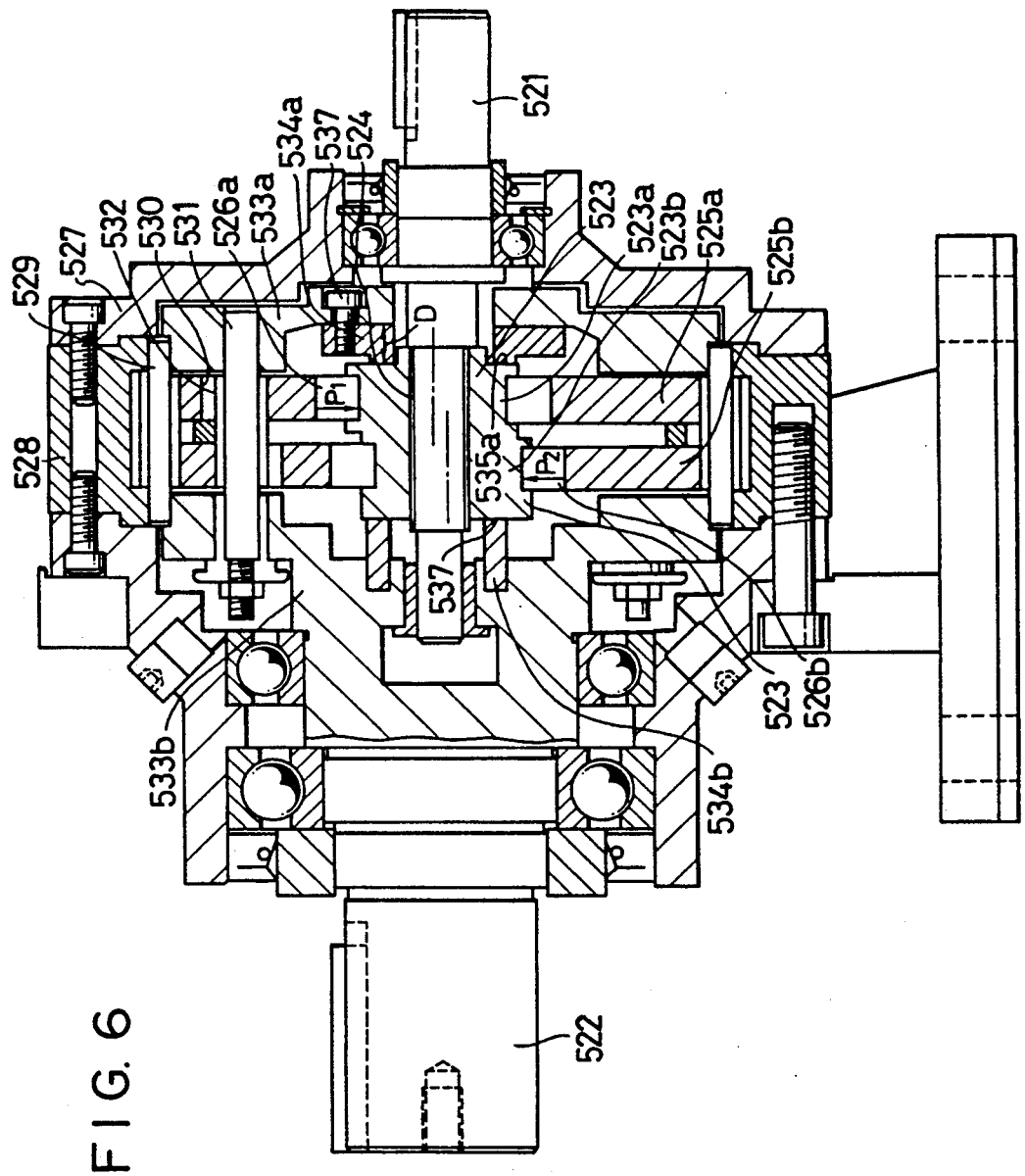
Figure 7:
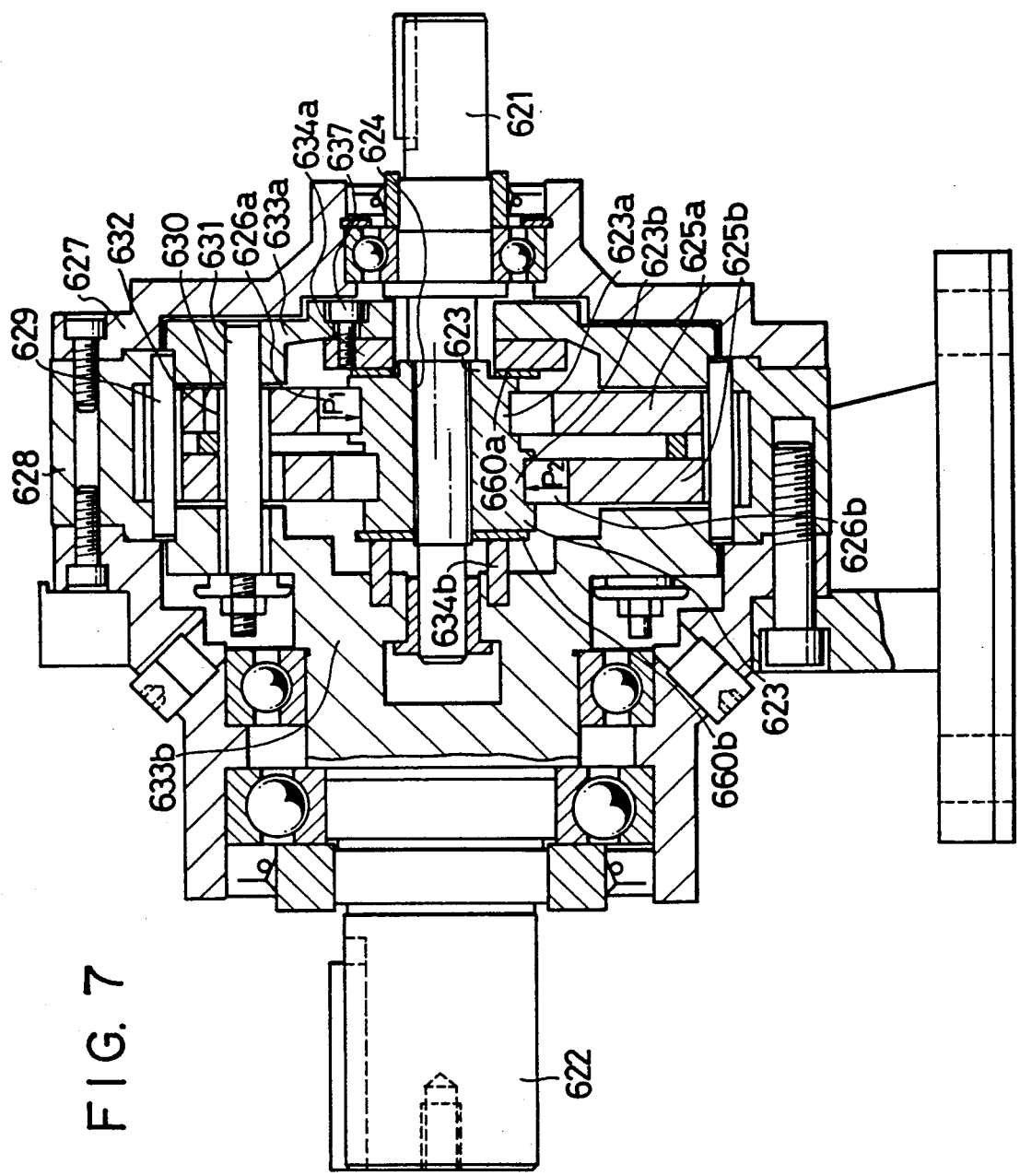

FIG. 6 and FIG. 7 show embodiments in which the inner pin retaining rings are provided with positioning members, and either surface treatment is applied to the sliding surfaces between the positioning members and the eccentric body to prevent wear and seizure, or washers to which surface treatment has been applied are placed between the positioning members and the eccentric body.

In FIG. 6, surface treatment is applied to each sliding surface 535a, 535b between the distance pieces 534a, 534b and the eccentric body shaft 523 to prevent wear and seizure. To be concrete, surface treatment techniques such as 1) carburizing, 2) nitriding, 3) high frequency treatment, 4) sulfurizing, 5) lubrizing, 6) coating, and the like can be employed.

As the basic constitution of FIG. 6 is the same as that for the embodiment of FIG. 3, only reference characters with the same two last digits are allocated to indicate the same or similar parts in the figure, and a repeated description will be omitted.

Since in the embodiment shown in FIG. 6 surface treatment is applied to the sliding surfaces 535a, 537 between the eccentric body shaft 523 and the distance pieces 534a, 534b to prevent wear and seizure, neither an increase in sliding resistance nor seizure will occur even if the gap between the eccentric body shaft 523 and the distance pieces 534a, 534b is made smaller. Also, it is possible to suppress abnormal wear and reduce transmission loss.

FIG. 7 shows another embodiment which is intended to be of the same spirit.

The embodiment has nearly the same constitution as the embodiment shown in FIG. 6. However, thrust washers 660a, 660b to which surface treatment has been applied are placed between the distance pieces 634a, 634b and the eccentric body shaft 623. Placing the thrust washers 660a, 660b between the distance pieces 634a, 634b and the eccentric body shaft 623 provides the possibility of facilitating the application of surface treatment to the sliding surfaces.

Moreover, replacement of the thrust washers 660a, 660b provides the possibility of taking measures against wear more readily and also facilitates the adjustment of the gap. Applying surface treatment also to the distance pieces 634a, 634b yields further benefits.

Figure 8:
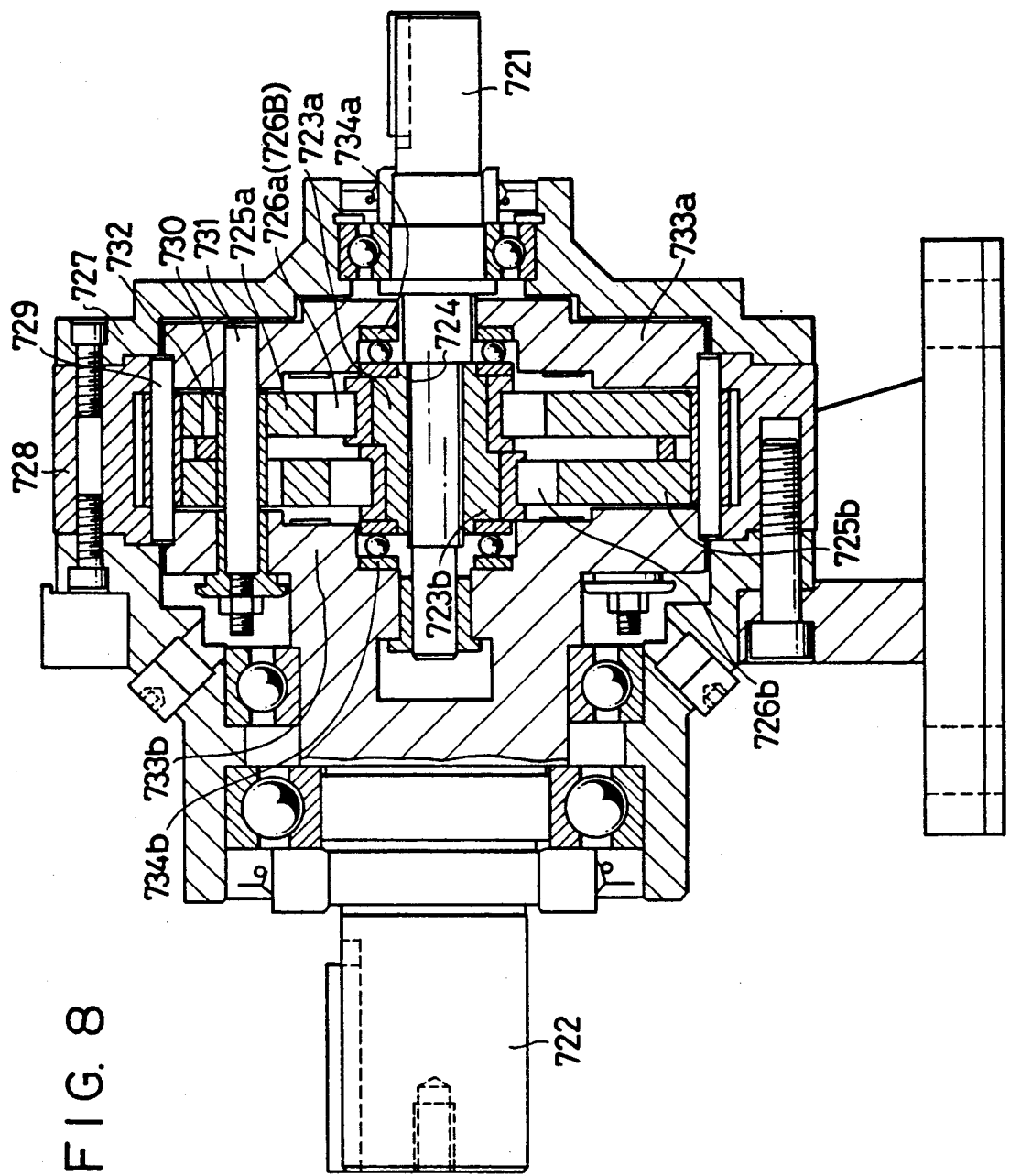
Figure 10A:
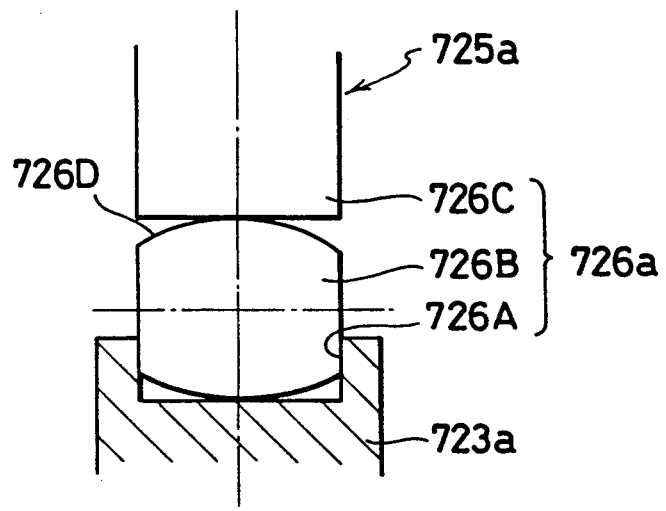
FIG. 10 is a drawing showing functional arrangements of the eccentric body and external-toothed gear of the seventh embodiment.
Figure 10B:
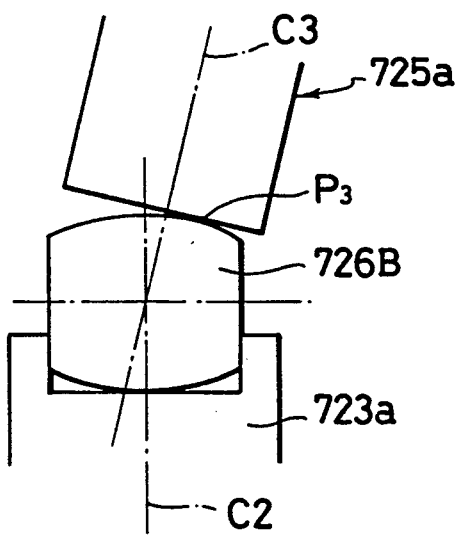

FIGS. 8 through 10 show embodiments which use thrust bearings as positioning members. The thrust bearings are mounted on the inner pin retaining rings, and axial crowning of the spline teeth or the rollers is applied.

As illustrated in FIG. 8, the embodiment is basically the same as the embodiment shown in FIG. 3. However, thrust bearings 734a, 734b are used.

Consequently, in spite of rotational sliding occurring between the eccentric bodies 723a, 723b and the inner pin retaining rings 733a, 733b, it is possible to satisfactorily accommodate the rotational sliding.

In FIG. 9, 721A illustrates a spline tooth which is formed at the circumference of the input shaft 721. An arch-shaped crowning 721B is formed along the tooth trace of the spline tooth 721A.

723A is a spline groove formed inside of the eccentric bodies 723a, 723b. The spline groove 723A is formed so that the spline groove 723A and the spline tooth 721A mesh. The side surfaces of the spline groove 723A are formed by planes.

C1 is the shaft of the spline tooth 721A. If the mounting part of the bearing which supports the input shaft 721 shows variations due to machining, or if the eccentric bodies 723a, 723b are inclined, the shaft C1 inclines relative to the spline groove 723A, as illustrated. However, since at that time the spline tooth 721A and the spline groove 723A come into contact at points P1, P2, it is possible to absorb the inclination. Therefore, it is possible to prevent end face contact between the spline tooth 721A and the spline groove 723A.

In the following, functional arrangements of the eccentric body and external-toothed gear will be described.

FIG. 10 shows functional arrangements of the eccentric body and the external-toothed gear. FIG. 10 (A) shows the normal state, and FIG. 10 (B) shows the inclined state. For the descriptions sake, only one eccentric body, one roller bearing and one external-toothed gear from among the eccentric bodies 723a, 723b, the roller bearings 726a, 726b and the external-toothed gears 725a, 725b are shown.

In the figure, 723a is the eccentric body with a groove (the inner ring of roller bearing 726a) 726A being formed in its circumference. Rollers 726B of a plurality of roller bearings 726a are mounted on the circumference of the eccentric body 723a with the groove 726A accommodating part of them. In addition, the external-toothed gear 725a which also serves as the outer ring 726C of the roller bearing 726a, is mounted on the circumference. Moreover, the rollers 726B of the roller bearings 726a are provided with an axial arch-shaped crowning 726D.

However, if there are thrust gaps in the thrust bearings 734a, 734b, the eccentric body 723a inclines, which causes, as shown in FIG. 10 (B), the shaft C2 of the eccentric body 723a and the shaft C3 of the external-toothed gear 725a to incline. Since at that time the roller 726B of the roller bearing 726a and the external-toothed gear 725a come into contact at point P3, it is possible to absorb the displacement. Therefore, it is possible to prevent end face contact between the roller 726B of the roller bearing 726 and the external-toothed gear 725a.

Figure 11:
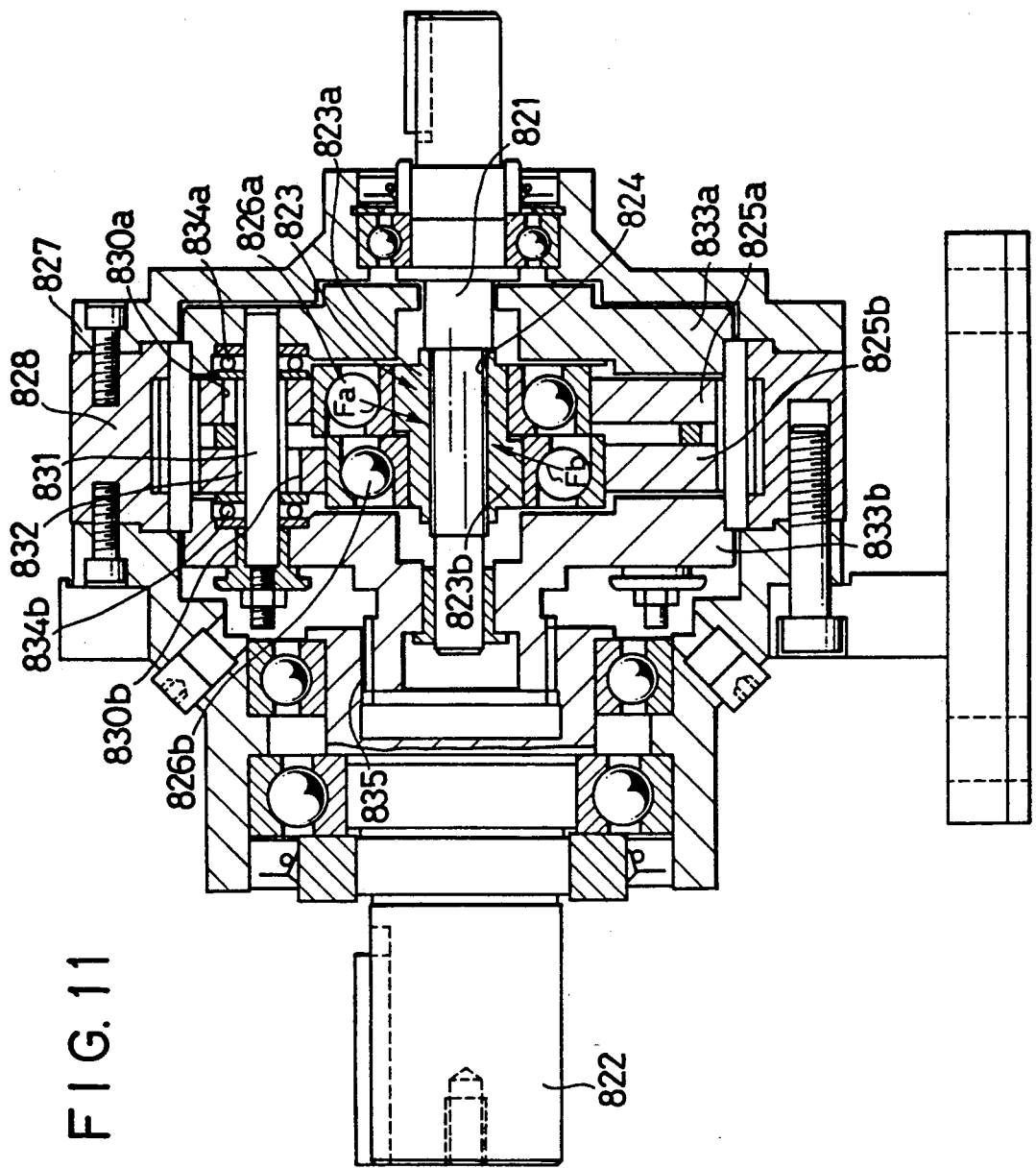
FIG. 11 and FIG. 12 are schematic drawings of longitudinal cross sections showing the eighth and ninth embodiment.

FIG. 11 shows another embodiment using a thrust bearing to prevent the eccentric body and the external-toothed gear from inclining relative to the input shaft (first shaft).

In FIG. 11, a hollow eccentric body shaft 823 is mounted on an input shaft 821. The eccentric body shaft 823 is coupled to the input shaft 821 by means of a flexible coupling means 824, such as a spline coupling or Oldham coupling, which absorbs the radial displacement. The eccentric body shaft 823 consists of two eccentric bodies 823a, 823b. Two external-toothed gears 825a, 825b are fitted to the eccentric bodies 823a, 823b by means of angular bearings 826a, 826b so that the two external-toothed gears 825a, 825b can rotate while swinging as much as the eccentricity of the eccentric bodies 823a, 823b.

The angular bearings 826a, 826b are ball bearings or roller bearings. These angular bearings 826a, 826b support both axial and radial loads and are arranged in this embodiment so that the directions of the bearing-action-line Fa, Fb face each other.

The amount of radial displacement due to the flexible coupling 824 between the eccentric body shaft 823 and the input shaft 821 is smaller than the eccentricity of the eccentric bodies 823a, 823b and ranges within limits which do not impair the function of the internally meshing rotation of the external-toothed gears 825a, 825b.

The circumferences of the external-toothed gears 825a, 825b are equipped, as before, with external teeth having a trochoidal tooth profile, and the external-toothed gears 825a, 825b and an internal-toothed gear 828 mesh internally. The internal-toothed gear 828 and a casing 827 are integrated into one body. The teeth of the internal-toothed gear 828 have a circular tooth profile and mesh internally with the external-toothed gears 825a, 825b.

The external-toothed gears 825a, 825b have inner pin holes 830a, 830b. In the inner pin holes 130, inner pins 831 are fitted with some clearance space in between. Inner rollers 832 are fitted to the circumference of the inner pins 831 with some clearance space in between. This kind of fitting providing some clearance space absorbs the swinging movement of the external-toothed gears 825a, 825b. However, it is also possible to omit the inner rollers 832.

Both ends of the inner pins 831 are tightly fitted into inner pin retaining rings 833a, 833b. The inner pin retaining rings 833a, 833b are mounted on both sides of the external-toothed gears 825a, 825b with the external-toothed gears 825a, 825b in between. The inner pin retaining ring 833b and the output shaft 822 are not directly coupled, but are coupled by means of a flexible coupling means 835, such as a spline coupling. The flexible coupling means 835 is not intended to absorb the swinging movement of the external-toothed gears 825a, 825b (as described above, the swinging movement of the external-toothed gears 825a, 825b is absorbed by the gaps between the inner pins 831 and the inner pin holes 830), but is intended to absorb slight swinging movements of the inner pin retaining ring 833b relative to output shaft 822.

A thrust bearing 834a is mounted between the inner pin retaining ring 833a and the external-toothed gear 825a. Also, a thrust bearing 834b is mounted between the inner pin retaining ring 833b and the external-toothed gear 825b. The two external-toothed gears 825a, 825b lie between the two thrust bearings 834a, 834b.

In the following the action of the embodiment shown in FIG. 11 will be described.

The load which acts on the two external-toothed gears 825a, 825b causes a moment to arise at the eccentric body shaft 823 (eccentric bodies 823a, 823b). However, since the moment is supported at the thrust bearings 834a, 834b located on both sides of the external-toothed gears 825a, 825b, it is possible to prevent the application of the radial offset load through the eccentric body shaft 823 to the input shaft 821.

Further, in the support system according to the embodiment there is, since the flexible coupling structure (such as a spline coupling or Oldham coupling) between the eccentric body shaft 823 and the input shaft 821 allows radial displacement, almost no application of the radial offset load from the eccentric body shaft 823 to the input shaft 821. Consequently, no radial load except the torsional load resulting from the rotating torque acts on the input shaft 821. Therefore, there is no vibration and noise caused by the whirling phenomenon of the input shaft 821, and it is possible to miniaturize or omit bearings used for supporting the input shaft 821.

Also, in this embodiment, since the external-toothed gears 825a, 825b are supported by the face-to-face duplex angular bearings 826a, 826b, the distance between the two external-toothed gears 825a, 825b has been substantially decreased, which provides the possibility of further reducing the moment itself.

In addition, when using the face-to-face duplex angular bearings 826a, 826b, the bearing-action-line Fa, Fb face each other. Thus if, for example, the radial load of the external-toothed gear 825b increases, the angular bearing 826a pushes the angular bearing 826b outwards (toward the output shaft 822). This results in an increase in the load of the external-toothed gear 825b, because the angular bearing 826b has been pushed outwards. Consequently, using the face-to-face duplex angular bearings 826a, 826b provides the external-toothed gears 825a, 825b with a mutual self-aligning function.

Therefore, the load acting on the external-toothed gears 825a, 825b is equally distributed, which, in conjunction with the presence of the thrust bearings 834a, 834b, eliminates the one-side load and further reduces the occurrence of abnormal wear, noise and vibration.

In addition, since the inner pin retaining ring 833b and the output shaft 882 are also flexibly coupled, it is also possible to satisfactorily absorb the radial offset load which is applied to the output shaft 822.

According to the embodiment of FIG. 11, the presence of the thrust bearings with the external-toothed gears lying in between facilitates providing lateral support of the thrust reactive force acting on the external-toothed gears. Therefore, combined with the flexible coupling between the eccentric body and the first shaft, it is possible to nearly eliminate the radial load which acts through the external-toothed gears and the eccentric body on the first shaft, and it is also possible to prevent vibration and noise resulting from the whirling phenomenon of the input shaft, and to provide the possibility of miniaturizing or omitting bearings used for supporting the input shaft.

Figure 12:
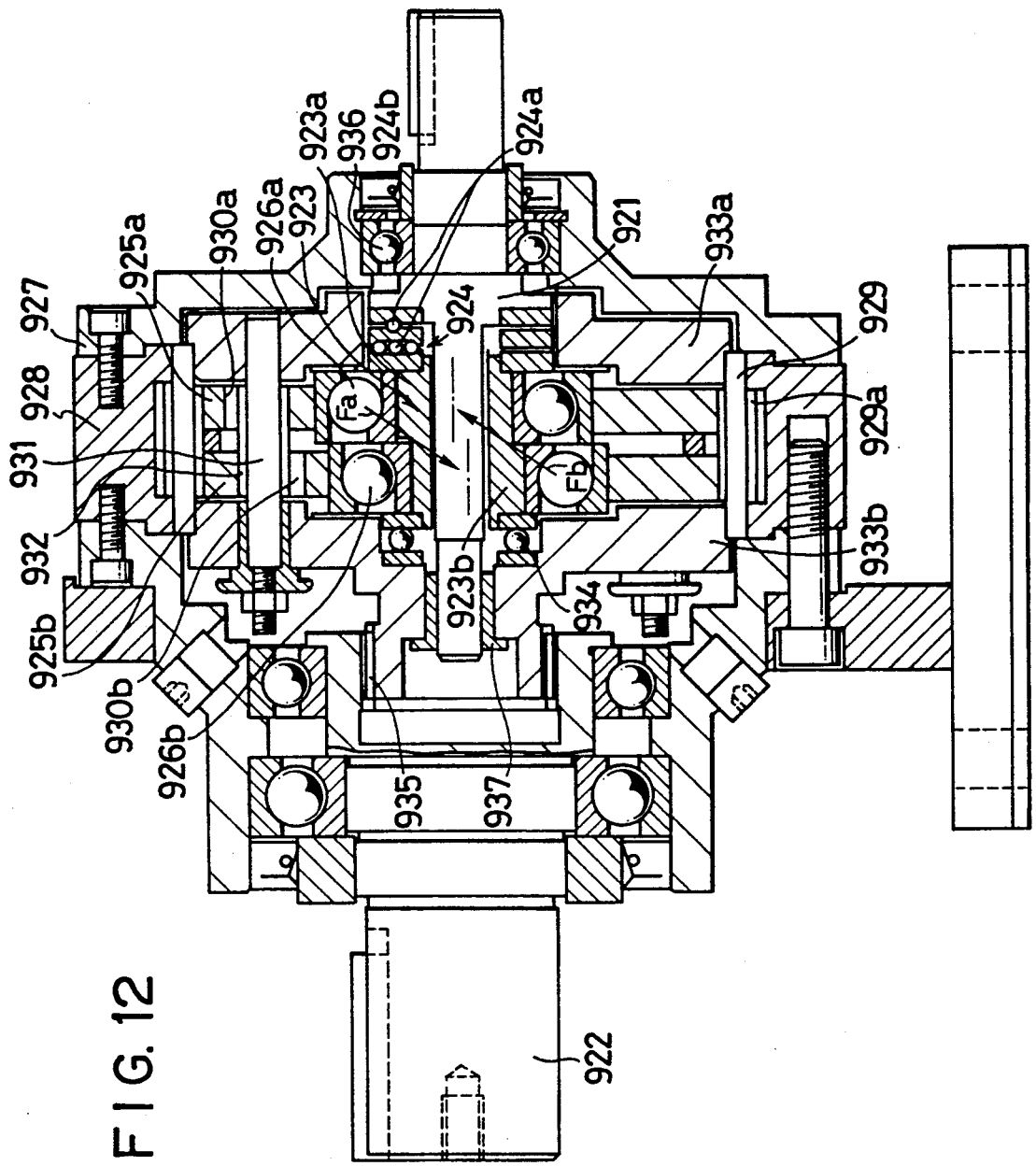
Figure 13:
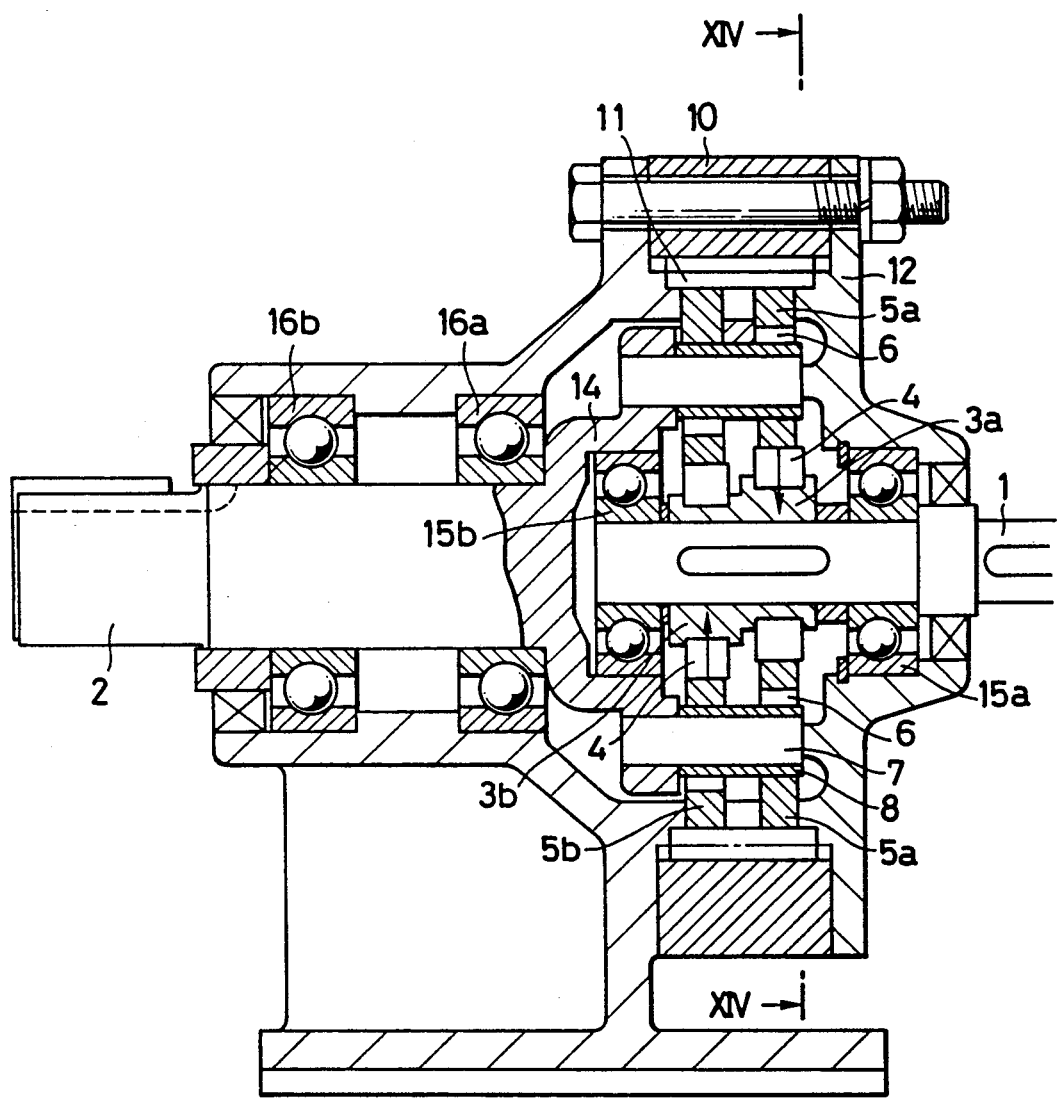
FIG. 13 is a drawing of a longitudinal cross section showing a reduction gear using a conventional internally meshing planetary gear structure.
Figure 14:
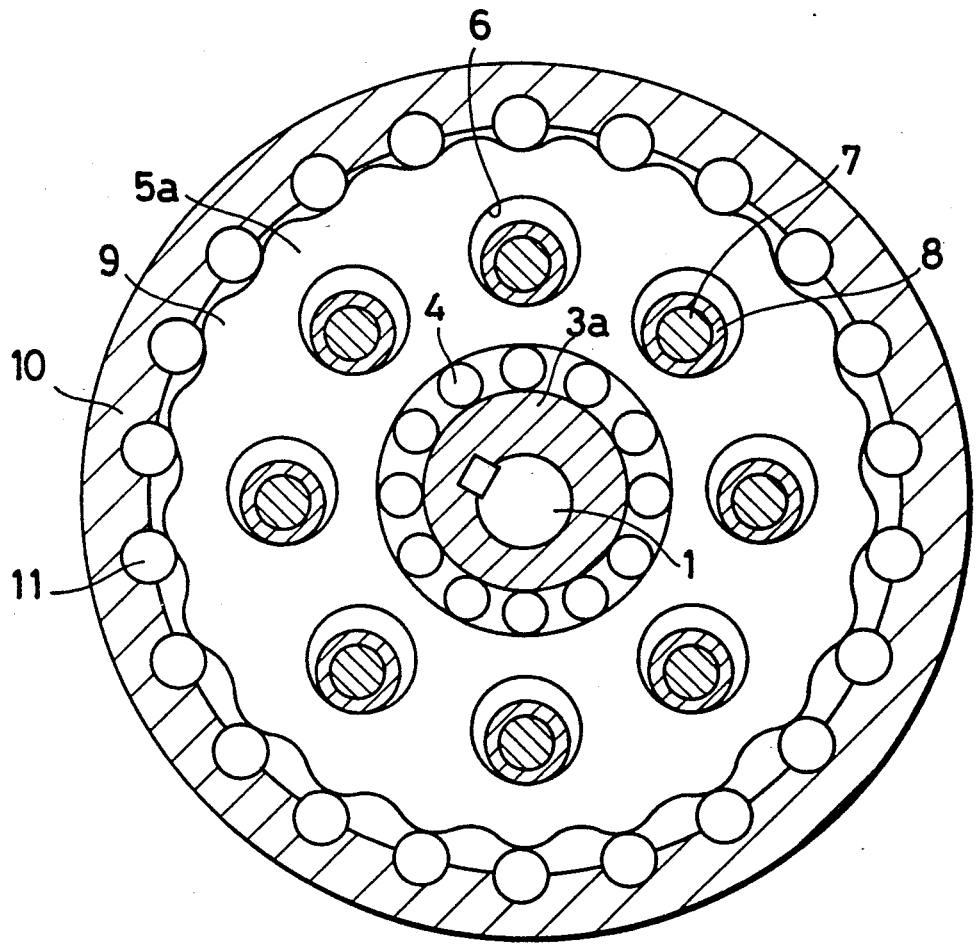
FIG. 14 is a drawing showing a cross sectional view taken along arrows XIV—XIV of FIG. 13.
Figure 15:
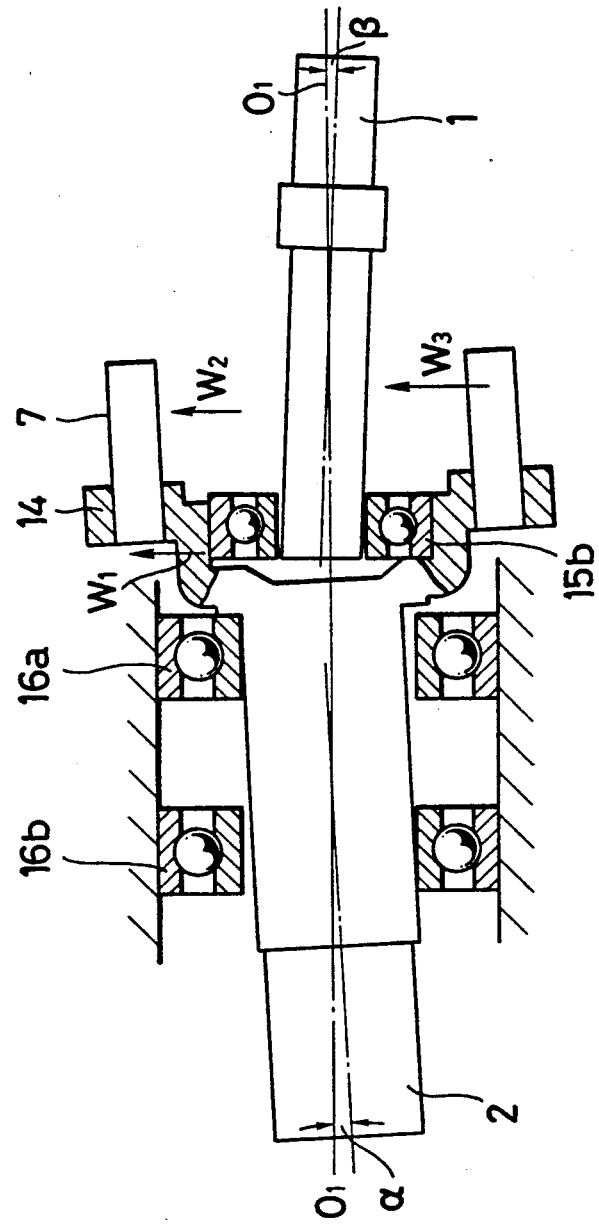
FIG. 15 and FIG. 16 are schematic drawings of partial cross sections for explaining drawbacks of the conventional internally meshing planetary gear structure.
Figure 16:
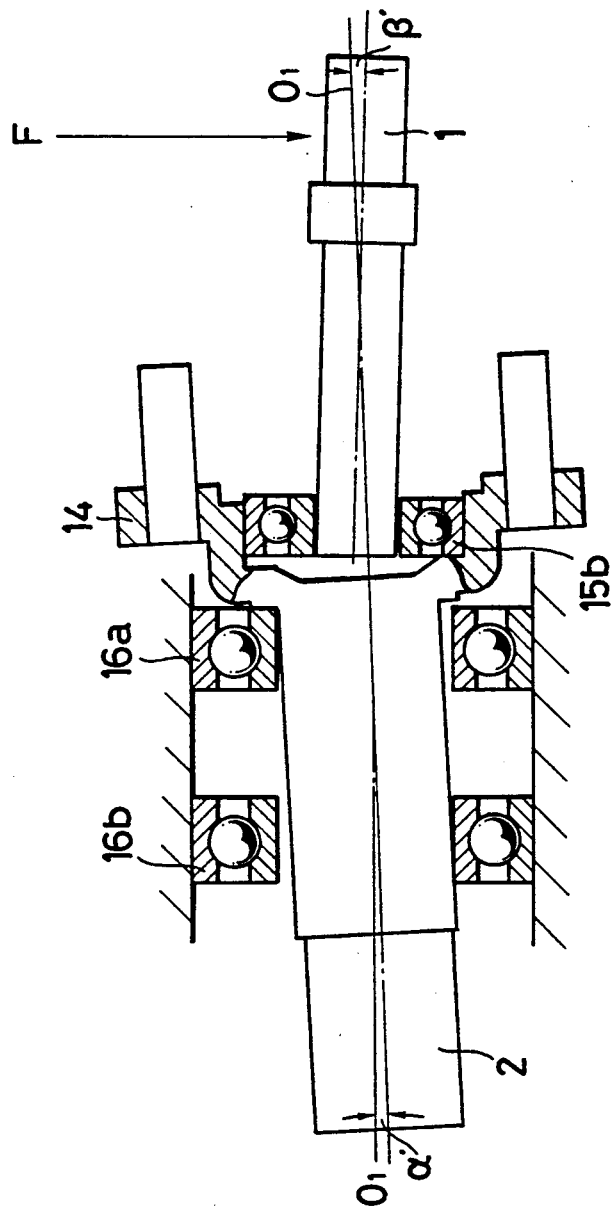

FIG. 12 shows an embodiment using a shaft coupling which can be radially displaced and which also serves as a thrust bearing, when the eccentric body and the input shaft (first shaft) are coupled.

In FIG. 12, a hollow eccentric body shaft 923 is mounted on an input shaft 921. The eccentric body shaft 923 is coupled to the input shaft 921 by means of a widely known ball type Oldham coupling 924 so that radial displacement of the eccentric body shaft 923 is possible. Reference characters 924a and 924b indicate the center piece and the ball of the Oldham coupling, respectively. It is well known that the ball type Oldham coupling 924 has the same structure as a thrust ball bearing, thus it can receive the thrust force arising from the eccentric body shaft 923.

The eccentric body shaft 923 consists of two eccentric bodies 923a, 923b. Two external-toothed gears 925a, 925b are fitted to the eccentric bodies 923a, 923b by means of angular bearings 926a, 926b, so that the two external-toothed gears 925a, 925b can rotate while swinging as much as the eccentricity of the eccentric bodies 923a, 923b.

The angular bearings 926a, 926b are ball bearings or roller bearings, which function to support both axial and radial loads and are arranged in this embodiment so that the directions of the bearing-action-line Fa, Fb face each other.

The amount of radial displacement of the eccentric body shaft 923 and the input shaft 921 due to the Oldham coupling 924 is smaller than the eccentricity of the eccentric bodies 923a, 923b and ranges within limits which do not impair the function of the internally meshing rotation of the external-toothed gears 925a, 925b.

The circumferences of the external-toothed gears 925a, 925b are equipped, as before, with external teeth having a trochoidal tooth profile, and the external-toothed gears 925a, 925b and an internal-toothed gear 928 mesh internally. The internal-toothed gear 928 and a casing 927 are integrated into one body. The internal-toothed gear 928 has a circular tooth profile formed by outer pins 929 and outer rollers 929a. The outer pins 929 which mesh internally with external-toothed gears 925a, 925b.

The external-toothed gears 925a, 925b are have inner pin holes 930a, 930b. In the inner pin holes 930a, 930b, inner pins 931 are fitted with some clearance space in between. Inner rollers 932 are fitted to the circumference of the inner pins 931 with some clearance space in between. This kind of fitting providing some clearance space absorbs the swinging movement of the external-toothed gears 925a, 925b. However, it is also possible to omit the inner rollers 932.

Both ends of the inner pins 931 are tightly fitted into inner pin retaining rings 933a, 933b. The inner pin retaining rings 933a, 933b are mounted on both sides of the external-toothed gears 925a, 925b with the external-toothed gears 925a, 925b in between. The inner pin retaining ring 933b and the output shaft 922 are not directly coupled, but are coupled by means of a flexible coupling means 935, as for example a spline coupling. The flexible coupling means 935 is not intended to absorb the swinging movement of the external-toothed gears 925a, 925b (as described above, the swinging movement of the external-toothed gears 925a, 925b is absorbed by the gaps between the inner pins 931 and the inner pin holes 930), but is intended to absorb slight swinging movements of the inner pin retaining ring 933b relative to the output shaft 922.

A thrust bearing 934 is mounted between one of the inner pin retaining rings 933b and the eccentric body shaft 923.

Reference characters 936 and 937 indicate bearings of the input shaft 921.

In the following the action of the embodiment shown in FIG. 12 will be described.

The load which acts on the two external-toothed gears 925a, 925b causes a moment to arise at the eccentric body shaft 923 (eccentric bodies 923a, 923b). However, since the moment is supported at the thrust bearing 934 and the ball type Oldham coupling 924 located on both sides of the eccentric body shaft 923, the application of the radial offset load through the eccentric body shaft 923 to the input shaft 921 is prevented.

Further, since the eccentric body shaft 923 and the input shaft 921 are coupled using the ball type Oldham coupling 924, the eccentric body shaft 923 has a flexible coupling structure which allows radial displacement of the eccentric body shaft 923 relative to the first shaft. Therefore, there is almost no radial load from the eccentric body shaft 923 to the input shaft 921. Consequently, no radial load except the torsional load resulting from the rotating torque acts on the input shaft 921. Thus, there is no vibration and noise caused by the whirling phenomenon of the input shaft 921, and it is possible to miniaturize or omit the bearings 936, 937 used for supporting the input shaft 921.

Also, in the embodiment of FIG. 12, since the external-toothed gears 925a, 925b are supported by the face-to-face duplex angular bearings 926a, 926b, the distance between the two external-toothed gears 925a, 925b has been substantially decreased, which provides the possibility of further reducing the moment itself.

In addition, when using the face-to-face duplex angular bearings 926a, 926b, the bearing-action-line of action Fa, Fb face each other. Thus if, for instance, the radial load of external-toothed gear 925b increases, the angular bearing 926a pushes the angular bearing 926b outwards (toward the output shaft 922). As a result, the angular bearing 926b is pushed outwards, which increases the load of the external-toothed gear 925b. Consequently, using the face-to-face duplex angular bearings 926a, 926b provides external-toothed gears 925a, 925b with a mutual self-aligning function.

Therefore, the load acting on the external-toothed gears 925a, 925b is equally distributed, which, in conjunction with the presence of the thrust bearing 934a and the ball type Oldham coupling 924, eliminates the one-side load and further reduces the occurrence of abnormal wear, noise and vibration.

In addition, in the embodiment of FIG. 12, since the inner pin retaining ring 933b and the output shaft 922 are also flexibly coupled, it is also possible to satisfactorily absorb the radial offset load which is applied to the output shaft 922.

Thus, according to the embodiment of FIG. 12, the presence of the thrust bearing and the shaft coupling, which also serves as a thrust bearing, with the eccentric body (shaft) lying in between facilitates providing lateral support of the thrust force acting on the eccentric body. Therefore, combined with the flexible coupling between the eccentric body and the input shaft, which allows radial displacement, it is possible to nearly eliminate the radial load which acts through the external-toothed gears and the eccentric body on the input shaft. Therefore, the constitution prevents vibration and noise resulting from the whirling phenomenon of the input shaft and provides the possibility of miniaturizing or omitting bearings used for supporting the input shaft.

Also, if the external-toothed gears are supported by face-to-face duplex angular bearings, the bearing-action-line of action are inclined so that their directions face each other, which provides the possibility of decreasing the real distance between the two external-toothed gears. This provides the possibility of reducing the moment which acts on the external-toothed gears and the eccentric body. Since in this case the bearing-action-line of action face each other, an increase in the load of one external-toothed gear rises to increase in the load of the other external-toothed gear, which provides the eccentric body and the external-toothed gears with an self-aligning function. Therefore, the load acting on the external-toothed gears is equally distributed, which eliminates the one-side load and further reduces the occurrence of abnormal wear, noise and vibration.

What is claimed is:

1. An internally meshing planetary gear structure which has a first shaft, an eccentric body mounted on the circumference of the first shaft, a plurality of external-toothed gears which are mounted eccentrically on said first shaft by means of said eccentric body, an internal-toothed gear which meshes internally with said external-toothed gears, and a second shaft coupled to said external-toothed gears through a means which transmits only the rotational component of said external-toothed gears about an input axis, comprising:

a coupling between said first shaft and said eccentric body, which allows radial displacement to an extent of not impairing a function of an internally meshing rotation of said external-toothed gears, and positioning members mounted on said first shaft and positioned adjacent to said eccentric body, said positioning members being located to restrict an axial movement of said eccentric body relative to the first shaft and to receive any moment which tends to incline said eccentric body relative to an axis line of the first shaft.

2. The internally meshing planetary gear structure according to claim 1, wherein two of said external-toothed gears are provided, and each external-toothed gear is fitted to said eccentric body by means of two angular bearings, said two angular bearings being positioned so that the directions of the bearing-action-line face each other.

3. The internally meshing planetary gear structure according to claim 1, wherein said coupling between the first shaft and the eccentric body is composed of a spline tooth engagement, and crowning is formed along the tooth trace of the spline tooth engagement.

4. The internally meshing planetary gear structure according to claim 1, wherein said external-toothed gears are fitted to said eccentric body by means of roller bearings, and axial crowning is formed at the rollers of said roller bearings.

5. The internally meshing planetary gear structure according to claim 1, wherein surface treatment, which prevents wear and seizure of sliding surfaces between said positioning members and said eccentric body, is applied to at least one of said sliding surfaces.

6. The internally meshing planetary gear structure according to claim 1, wherein thrust washers to which surface treatment has been applied to prevent wear and seizure, are placed between sliding surfaces of said positioning members and said eccentric body.

7. The internally meshing planetary gear structure according to claim 1, wherein a gap between said positioning members and said eccentric body is controlled to maintain a predetermined specific gap.

8. An internally meshing planetary gear structure which has a first shaft, an eccentric body mounted on the circumference of said first shaft, a plurality of external-toothed gears which are mounted eccentrically on said first shaft by means of said eccentric body, an internal-toothed gear which meshes internally with said external-toothed gears, and a second shaft coupled to said external-toothed gears through a means which transmits only the rotational component of said external-toothed gears about an input axis, said means which transmits only the rotational component of the external-toothed gears being composed of inner pin holes formed by passages in said external-toothed gears, and inner pins which have a diameter smaller than a diameter of said inner pin holes, pass through said inner pin holes and are tightly fixed to the second shaft, said structure comprising:

a coupling between said first shaft and said eccentric body, which allows radial displacement to an extent of not impairing a function of an internally meshing rotation of said external-toothed gears, inner pin retaining rings which retain said inner pins and which are mounted on both sides of said external-toothed gears with the external-toothed gears in between, and thrust bearings which are positioned between said inner pin retaining rings and said external-toothed gears, respectively.

9. The internally meshing planetary gear structure according to claim 8, wherein two of said external-toothed gears are provided, and each external-toothed gear is fitted to said eccentric body by means of two angular bearings, said two angular bearings being positioned so that the directions of the bearing-action-line face each other.

10. The internally meshing planetary gear structure according to claim 8, wherein said coupling between the first shaft and the eccentric body is composed of a spline tooth engagement, and crowning is formed along the tooth trace of said spline tooth engagement.

11. The internally meshing planetary gear structure according to claim 8, wherein said external-toothed gears are fitted to said eccentric body by means of roller bearings, and axial crowning is formed at the rollers of said roller bearings.

12. An internally meshing planetary gear structure which has a first shaft, an eccentric body mounted on the circumference of said first shaft, a plurality of external-toothed gears which are mounted eccentrically on said first shaft by means of said eccentric body, an internal-toothed gear which meshes internally with said external-toothed gears, and a second shaft coupled to said external-toothed gears through a means which transmits only the rotational component of said external-toothed gears about an input axis, said means which transmits only the rotational component of the external-toothed gears being composed of inner pin holes formed by passages in said external-toothed gears, and inner pins which have a diameter smaller than a diameter of said inner pin holes, pass through said inner pin holes and are tightly fixed to said second shaft, said structure comprising:

inner pin retaining rings, which retain said inner pins and which are mounted on both sides of said external-toothed gears with the external-toothed gears in between, and thrust bearings which are positioned between one of said inner pin retaining rings and said eccentric body, and which restrict the eccentric body's axial movement toward a side of said one inner pin retaining ring, and a shaft coupling which is positioned between said first shaft and said eccentric body, which allows radial displacement of said eccentric body to an extent of not impairing a function of an internally meshing rotation of said external-toothed gears, said shaft coupling having a thrust bearing function of restricting the axial movement of said eccentric body toward the side of said other inner pin retaining ring.

13. The internally meshing planetary gear structure according to claim 12, wherein two of said external-toothed gears are provided, and each external-toothed gear is fitted to said eccentric body by means of two angular bearings, said two angular bearings being positioned so that the directions of the bearing-action-line face each other.

14. The internally meshing planetary gear structure according to claim 12, wherein said external-toothed gears are fitted to said eccentric body by means of roller bearings, and axial crowning is formed at the rollers of said roller bearings.

* * * * *